US008095737B2

United States Patent
Elazary et al.

(12) United States Patent
(10) Patent No.: US 8,095,737 B2
(45) Date of Patent: Jan. 10, 2012

(54) CONTENT NETWORK GLOBAL REPLACEMENT POLICY

(75) Inventors: Lior Elazary, Agoura Hills, CA (US);
Alex Kazerani, Los Angeles, CA (US);
Jay Sakata, Stevenson Ranch, CA (US)

(73) Assignee: EdgeCast Networks, Inc., Santa Monica, CA (US)

( * ) Notice: Subject to any disclaimer, the term of this patent is extended or adjusted under 35 U.S.C. 154(b) by 0 days.

(21) Appl. No.: 12/973,605

(22) Filed: Dec. 20, 2010

(65) Prior Publication Data
US 2011/0087844 A1   Apr. 14, 2011

Related U.S. Application Data

(63) Continuation of application No. 11/899,910, filed on Sep. 7, 2007, now Pat. No. 7,921,259.

(51) Int. Cl.
*G06F 12/00* (2006.01)
(52) U.S. Cl. ....................................... 711/133
(58) Field of Classification Search ........................ None
See application file for complete search history.

(56) References Cited

U.S. PATENT DOCUMENTS

| | | | |
|---|---|---|---|
| 6,272,598 B1 | 8/2001 | Arlitt et al. | |
| 6,415,368 B1 | 7/2002 | Glance et al. | |
| 6,463,508 B1 | 10/2002 | Wolf et al. | |
| 6,976,090 B2 | 12/2005 | Ben-Shaul et al. | |
| 6,986,018 B2* | 1/2006 | O'Rourke et al. | ............ 711/213 |
| 2003/0115421 A1 | 6/2003 | McHenry et al. | |
| 2010/0275125 A1 | 10/2010 | Elazary et al. | |

OTHER PUBLICATIONS

Non-Final Office Action dated Dec. 23, 2010 in U.S. Appl. No. 12/833,211.

* cited by examiner

*Primary Examiner* — Hiep Nguyen
(74) *Attorney, Agent, or Firm* — Ropes & Gray LLP

(57) ABSTRACT

This invention is related to content delivery systems and methods. In one aspect of the invention, a content provider controls a replacement process operating at an edge server. The edge server services content providers and has a data store for storing content associated with respective ones of the content providers. A content provider sets a replacement policy at the edge server that controls the movement of content associated with the content provider, into and out of the data store. In another aspect of the invention, a content delivery system includes a content server storing content files, an edge server having cache memory for storing content files, and a replacement policy module for managing content stored within the cache memory. The replacement policy module can store portions of the content files at the content server within the cache memory, as a function of a replacement policy set by a content owner.

27 Claims, 5 Drawing Sheets

CONTENT NETWORK GLOBAL REPLACEMENT POLICY

CROSS-REFERENCE TO RELATED APPLICATIONS

This application is a continuation of U.S. application Ser. No. 11/899,910, filed Sep. 7, 2007, the entire contents of which are incorporated herein by reference.

FIELD OF THE INVENTION

The invention relates to systems and methods for distributing content over a wide area data network.

BACKGROUND OF THE INVENTION

Today, the Internet continues to grow as a medium for delivering content. One of the factors driving the growth and success of the Internet as a medium for delivering content is the proliferation of high-speed Internet access to the home. This provides a high quality data channel to the home of consumers and allows for marketers and other individuals to provide quality commercial video and audio to the home user. Thus, the Internet offers a high quality and flexible medium for presenting media content, which is typically commercial advertising content, to the end user.

The excellent connectivity of the Internet has also driven the use of this medium for delivering commercial video and audio to the home user. To deliver high quality content, often large data files need to be moved across the Internet. One problem faced by content owners or providers is how to cost-effectively deliver these large files in such a way that the quality of service and the quality of the media received by the end user is sufficient for the task at hand. To address these problems, companies have developed content delivery networks (CDN) that are well suited for delivering high quality commercial video over the Internet cost effectively and with good quality of service.

One example of a content delivery network and service is the network and service offered by the Akamai Company of Cambridge, Mass. Akamai provides a content delivery service that cost effectively delivers content across the Internet. To that end, Akamai established a content delivery network that comprises a set of servers, called edge servers, that are disposed at certain network locations on the Internet. These network locations correspond to geographic locations that have been determined by Akamai to be proximate to a large number of Internet users. Thus the edge servers are placed at a location where they are physically close to a large number, if not the majority, of Internet users and as such they are described as being at the edge of the network, at the point right before the Internet connects to the home user. Delivering content from these edge servers down to local users is thus understood to be quick and relatively affordable. By contracting with Akamai, a content owner or provider can store content at these edge servers. When the home user requests content from the content provider, Akamai can deliver that content to the user from the closest edge server by identifying the edge server that has the requested content and that is most proximate to that user.

Thus, the content delivery network of Akamai acts as a large cache system that is strategically located across the Internet and that can store content for delivery to an end user. To manage the cache memory, Akamai provides tools, such as the advanced cache control system, that make a content provider's web pages cacheable and that adjust pages being served from the cache so that they appear to have been served from the site of the content provider. Other cache management tools are also provided. For example, in U.S. Pat. No. 7,010,578, assigned to Akamai Technologies of Cambridge, Mass. there is disclosed a system for organizing third party cache appliances into cache memory devices that can be made part of a content delivery network. Additionally, U.S. Pat. No. 7,143,170 discusses a system for the automatic migration of data via a distributed computer network. The disclosed method and apparatus allow a customer to select content files that are to be transferred to a group of edge servers. The edge server maintains a dynamic number of popular files in its memory for the customer and the files are ranked from most popular to least popular. When a file has been requested from an edge server a sufficient number of times to become more popular than the lowest popular stored file, the file is obtained from an origin site. Thus, these technologies expand the size and number of locations of the content delivery network and the control over these servers, thus increasing the efficiency and flexibility of that network.

Although content delivery networks can work quite well and provide the CDN owner with tools for efficient and effective delivery of large data files, there is a need in the art to provide for more robust mechanisms for allowing content owners or providers who are CDN customers to ensure how their content files are delivered from the cache memories of the content delivery networks.

SUMMARY OF THE INVENTION

The systems methods described herein include systems and methods for allowing a content network to more efficiently and controllably deliver content to a user. In particular, the systems and methods described herein include a global replacement policy and process that controls how data is replaced in a cache memory located at the furthest edge of a wide area network. The global replacement policy provides control to the content owner so that the content owner can control and regulate how content is placed into the cache at the edge of the network.

More particularly, the invention includes, in one aspect, processes for allowing a content provider to control a replacement process operating at an edge server. This process may comprise the step of providing an edge server for servicing a plurality of content providers and having a data store for storing content associated with respective ones of the content providers. In a further step, a content provider may set a replacement policy at the edge server for controlling the movement of content that is associated with the respective content provider, into and out of the data store. In this process, the content provider has control over at least a portion of the data being maintained in the data store.

In one particular practice, this process may also include the step of setting a replacement policy for use with the data store wherein that data store has a persistent memory device and a volatile memory device. Additionally, the replacement policy may control the replacement of content stored in the persistent memory device and the replacement of content stored in the volatile memory device.

In a further practice, the process may include the step of locking content in the data store for preventing the content from being replaced. To this end, the process may include the step of providing the content provider with a control for locking content in the data store.

In another further practice, the process may include the optional step of allowing the content provider to pre-load content into the data store of the edge server. Additionally and also optionally, the process may allow the content provider to purge content from the data store.

In a further practice, the process can allow the content provider to set a replacement policy to operate as a function of a characteristic of the content delivery process. The characteristic may be representative of a geographic region associated with the client requesting content or may be representative of some other aspect or characteristic such as the time of content delivery, content type, size of content file, file download rate, frequency of file access, and cost of file replacement. In a further practice, the process can allow a content provider to set two or more replacement policies for applying to the respective content files. Additionally and optionally, an override replacement policy may be put in place or a default replacement policy may be put in place. In either case, the user's content may be subject to a replacement policy set by the user or a replacement policy set by a network administrator, or some other authorized user capable of either controlling or overriding the replacement policy used at edge servers.

In another aspect, the systems and methods described herein include content delivery systems that comprise a content server for storing a plurality of content files, and edge server in communication with the content server and having cache memory for storing a plurality of content files and a replacement policy module for managing content stored within the cache memory for removing portions of the content files at the content server within the cache memory at the edge server as a function of a replacement policy set by a content owner.

In one particular embodiment, the edge server cache memory includes a persistent memory and volatile memory. In a further embodiment, the system may have a controller for allowing a content owner to set the replacement policy. The replacement policy module may control the replacement content stored in the persistent memory and the replacement of content stored in the volatile memory. The content delivery system may include a locking module for preventing content from being removed from the cache memory. It may also include a pre-load module for pre-loading content into the cache memory of the edge server. Additionally and optionally, the content delivery system may include a purging module for purging parts of content from the data store and a replacement module that operates as a function of a characteristic of the content delivery process when that characteristic may be as set forth above representative of the geographic region associated with a client requesting content, with a time of content delivery, with a content type, size of content files, file download rate, frequency of file access, a cost of file replacement or some other meaningful characteristic. Further optionally, the content delivery system may include a replacement module that has a mechanism to allow a content provider to set two or more replacement policies for applying to a respective content file.

Other objects of the invention will, in part, be obvious, and, in part, be shown from the following description of the systems and methods shown herein.

BRIEF DESCRIPTION OF THE DRAWINGS

The foregoing and other objects and advantages of the invention will be appreciated more fully from the following further description thereof, with reference to the accompanying drawings wherein.

DESCRIPTION OF THE ILLUSTRATED EMBODIMENTS

Figure 1:
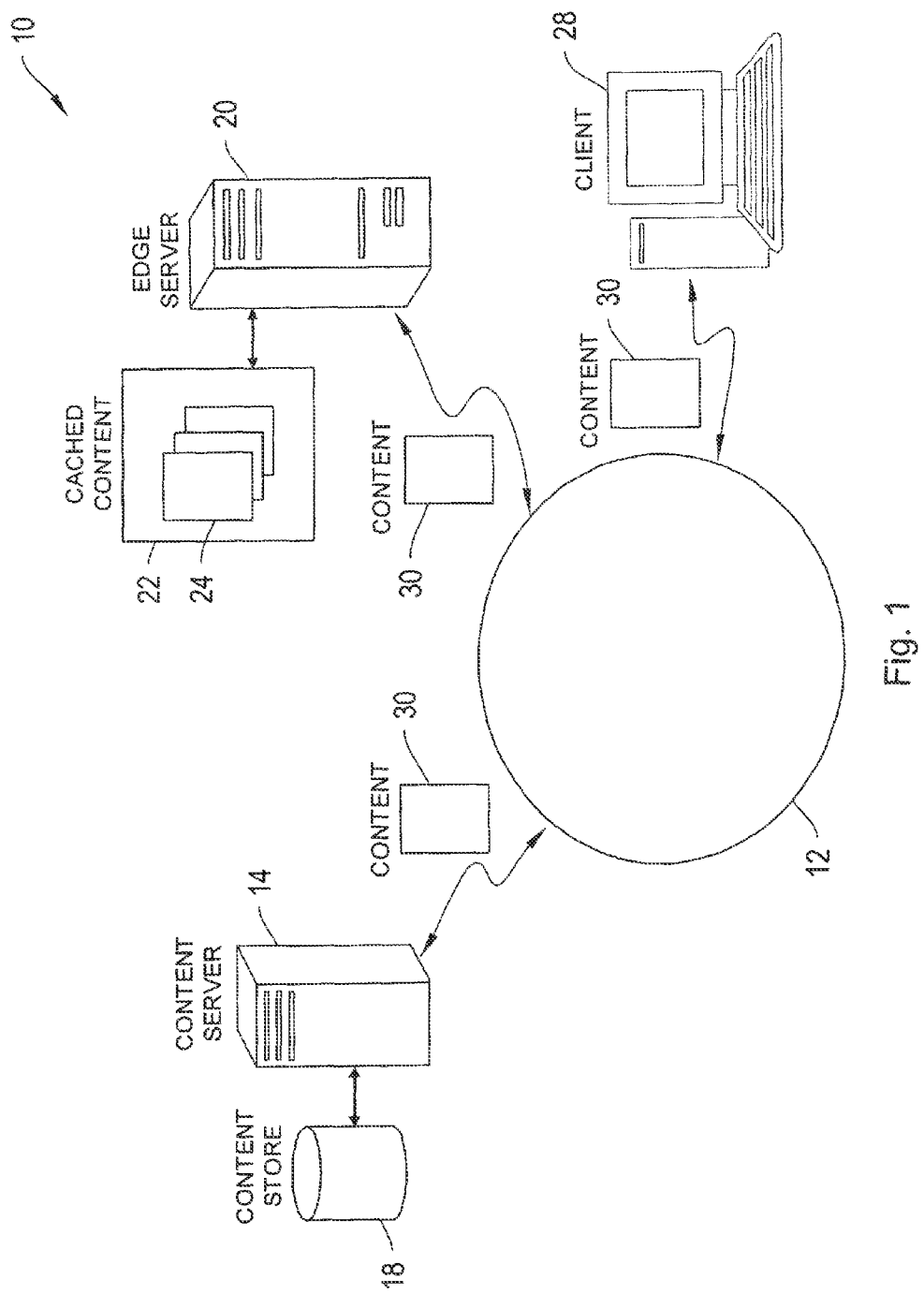
FIG. 1 depicts a content delivery network with an edge server having cached content.

To provide an overall understanding of the invention, certain illustrative embodiments will now be described, including a system that allows a content provider to control the replacement process used to replace content stored at edge servers in a content delivery network. However, it will be understood by one of ordinary skill in the art that the systems and methods described herein may be adapted and modified for other suitable applications and that such other additions and modifications will not depart from the scope hereof.

Thus, it is one embodiment of the invention that provides systems and methods, such as those described herein, that allow a content provider to control a replacement process that occurs at one or more edge servers of a content delivery network. The memory space at an edge server is limited and thus requires that the cache memory provided by the edge server, and in particular the volatile memory at the edge server, be managed so that the content most important to the content provider is stored at the edge server. In a typical content delivery network, the edge server employs a replacement policy that identifies the least requested unit of content (the LRU Replacement Policy) and will delete from the cache memory at the edge server that content which has been least frequently requested by users on the network. Although this system may work well, it is crude and not well suited for today's content provider who has invested heavily in the content that is being delivered to users and would like greater control over what content stays at the edge server. For example, the LRU replacement policy may, given the circumstances, remove from the cache important content, such as content that is expensive to move over the full network or important to insuring that each user experience is at a level of quality consistent with that which the content provider wishes to deliver. Thus, although a portion of content may be the least requested portion of content from the edge server, it may be important to the content provider.

For example, the content provider may deliver as part of its home page a brief video presentation of an important announcement. This occurs when, for example, an event promoter sets up a website to give information about an annual event, such as at trade show, that the promoter hosts. The first time the user requests the home page associated with that annual event, the content provider may wish the user to receive a brief high quality video that describes in detail the event being promoted. Other content on the website, such as directions, ticket prices, and other useful information may be requested frequently by users. However, to the content provider it may be key that the video content is maintained at the edge server so that for each initial contact the user receives a high quality video experience because the content is delivered from a local server. Thus the content provider will want the video content to be maintained in the cache memory.

The systems and methods described herein allow the content provider to access a central site from which the content provider can set up content that is stored in the cache memory in the edge server. In particular, from the central site, the content provider can set a replacement policy that controls what content is maintained within the edge server cache memory and sets up rules for how content stored within that cache memory is to be replaced. During operation, the edge server handles requests for content from users and populates the cache memory of the edge server with the content requested by the user. As the cache memory begins to fill and the edge server needs to replace some of the content in the cache memory, the edge server uses the replacement policy established by the content provider to select content to remove from the edge server cache memory. In this way, the systems and methods described herein allow a content provider to establish a replacement policy that is suited to the needs of that content provider.

Turning to FIG. 1, one system for a content delivery network according to the invention is depicted. The depicted system has an edge server that includes a cache memory for storing content requested by a client or a user, where the local replacement policy executed on that edge server is set by the content provider to control the replacement of content from that cache in a manner desired by the content provider. In particular, FIG. 1 depicts a content delivery network 10 that includes a computer network 12 such as a wide area network like the Internet, a content server 14 that has a content store 18, an edge server 20 having a cache memory 22 with cache content 24 stored therein, a client or user 28 and content 30 that is moved about the network. System 10 depicted in FIG. 1 can be any computer network, but in the embodiments described herein the system 10 will be a content delivery network of the type that operates on the Internet and the computer network 12 depicted in FIG. 1 will be understood to be the Internet. The content server 14 may be any suitable computer system capable of storing and delivering content and will typically be a data server that stores web pages and video content that may be requested over the Internet by a user such as the depicted user 28.

In the embodiment depicted in FIG. 1 the content store 18 may be a data memory that stores video content, audio content, web pages and any other kind of content that may be transferred over the network 10. Usually, the content store 18 is a set of web pages and media files, or the data store can be a database. The database can be any suitable database system, including the commercially available Microsoft Access® database, and can be a local or distributed database system. The design and development of suitable database systems are described in McGovern et al., A Guide To Sybase and SQL Server, Addison-Wesley (1993). The database can be supported by any suitable persistent data memory, such as a hard disk drive, RAID system, tape drive system, floppy diskette, or any other suitable system. The system depicted in FIG. 1 depicts the content store 18 as a database device that is separate from the content provider's server platform, however, it will be understood by those of ordinary skill in the art that in other embodiments the database device can be integrated into the system 14.

The content server 14 can be maintained by the content provider within its facility or at a hosting site such as that provided by the Web.com Company of Atlanta, Ga. At the hosting site, the hardware and software needed for running a website is maintained. The content provider, such as the event promoter discussed above, may store content in the content store 18 and may configure web server software executing on the content server 14 so that a website having the content, applications and features desired by the content provider is set up for users to access and interact with. The depicted content server may be any server that generates and serves web pages, images, video, audio or other types of files. The computer platform of the content server may be any suitable server such as an Intel based server running Microsoft Windows Operating System or Linux Operating System.

The web server executing on the content server 14 is typically an HTTP server process and may be any suitable server process including the Apache server or a streaming server handling real time protocols. Suitable servers are known in the art and are described in Jamsa, Internet Programming, Jamsa Press (1995), the teachings of which are herein incorporated by reference. In one embodiment, the HTTP server process serves HTML pages representative of content, such as static web pages, or dynamically generated web pages, such as search request web pages, to client processes making requests for such pages. An HTTP server listener process may be an executing computer program operating on the server 14 and which monitors a port and listens for client requests to transfer a resource file, such as a hypertext document, an image, audio, animation, or video file from the server's host to the client process host. In one embodiment, the client process employs the hypertext transfer protocol (HTTP) wherein the client process transmits a file request that specifies a file name, an Internet location (host address), and a method, such as the HTTP, or any other proprietary or standard protocol suitable to retrieve the requested file. The HTTP server listener process detects the client request and passes the request to the executing HTTP server processors. It will be apparent to one of ordinary skill in the art, that a plurality of HTTP server processes can be executing on the server 14 simultaneously. The HTTP server processors can pass the file request typically round-robin style until an HTTP server process is identified that is available to service the client's request.

The edge server 20 depicted in FIG. 1 may be part of a content delivery network that is set up over the network 12. The structure and operation of the edge server may be similar to the structure and operation of the content provider server 14 discussed above, and may include a web server process, and a database system. The content delivery network may be realized as a collection of these edge servers that are located at positions on the network 12 that are proximate to a substantial number of users requesting data across the network 12.

In one example, the content delivery network is a network such as the Akamai content delivery network (CDN) or the Edgecast content delivery network. These CDNs may identify locations on the network that are intersection points where a number of traffic flows come together. The CDN places its edge servers at these intersection points and it is understood that the content stored at those edge servers 20 may be delivered more quickly and efficiently than content stored at other locations on the network. In the system depicted in FIG. 1, the edge server 20 has a cache memory 22 into which cached content 24 is stored. The cached content 24 is content that the edge server maintains locally as the edge server determines that this content is often requested by users 28. By storing that commonly requested content locally, the edge server 20 may reduce the amount of content that has to be sent directly from the content server 14 to the client 28. However, the systems and methods described herein are not limited to use with any particular type of network or CDN and the criteria selected by a CDN for the location of the edge servers and the number of edge servers used on the network can vary.

The client 28 may be any user system running a data processing platform that has a client process, typically called a browser, capable of accessing web content over the network 12. As shown in FIG. 1, content 30 is transmitted from either the content server 14 or the edge server 20 to the client 28 when the client 28 makes an HTTP request through its browser. The client process may be a computer program operating on the client station 28, that is capable of downloading and responding to computer files served by the server 14. In particular, the client process may be a browser program that is capable of forming one or more connections to an HTTP server process for transferring content from the HTTP server process to the client process. Such a browser process can be the Netscape Navigator browser process, the Microsoft Explorer browser process, or any other conventional or proprietary browser process capable of downloading pages or other content served by the server 14. The client 28 may be a computer system, a wireless phone, and handheld computer, a network device, or any other type of client capable of requesting data over the network 12.

Figure 2:
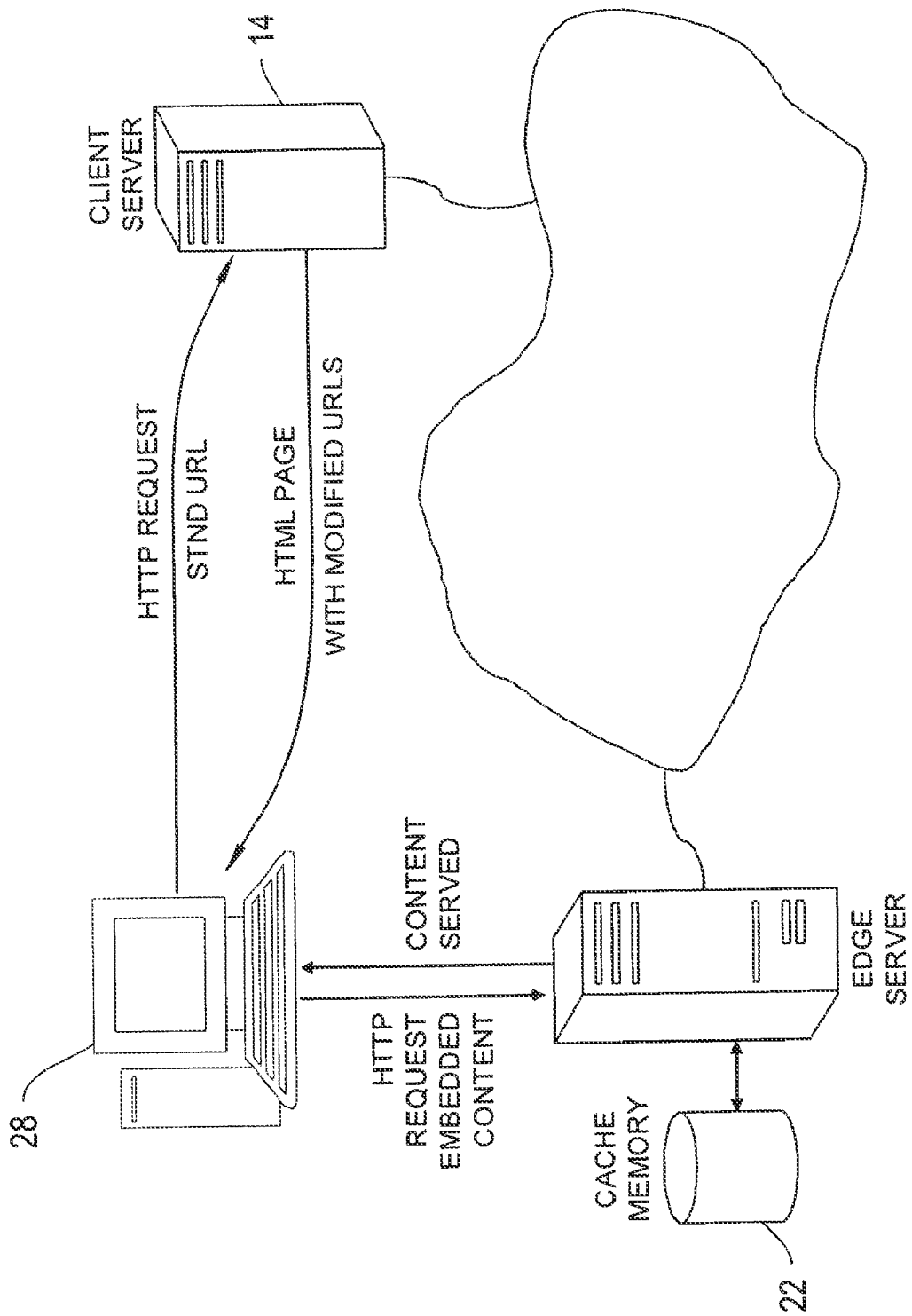
FIG. 2 depicts the flow of data across the content delivery network.

FIG. 2 depicts in more detail the flow of content over the network 10 depicted in FIG. 1. In particular, FIG. 2 shows that the content delivery network 10 depicted in FIG. 1 allows for high performance content delivery by directing requests typically for media-rich web objects to the content delivery network servers. In one known practice, content is first tagged for delivery by the content provider which, for example, may be done by a tool that converts the URL on a web page, such as a URL pointing to media rich content, to a modified resource locator.

FIG. 2 illustrates how the website at server 14 may operate after given embedded objects in a web page have been modified to point to locations on the content delivery network. As illustrated in that Figure, the content provider's web servers preferably still serve the basic or base HTML page, although this is not a requirement. However, the URLs of the embedded objects within that page have been modified as known in the art and no longer resolve to the content provider's site in the first instance, but rather resolve to the content delivery service network. Thus, when the client requests content from the content provider's sites, the content delivered to the client may include HTML codes that include these modified URLs which point to media rich content stored on edge servers located on the content delivery network.

Typically, at the user's computer the modified URLs are resolved and the user's browser makes a request directed to the edge server that is closest to the client and contains the requested content. In response to receiving the request, the edge server may fetch from its cache memory 22 the requested content and deliver it to the client so that the delivered content gets integrated into the web page delivered from the content provider's site. As discussed above, each edge server has a limited amount of cache memory and only a certain amount of content may actually be stored. Typically, a content provider contracts with a content delivery network to have the content served from the edge of the network and for the content delivery network to provider a certain allocation of memory space at the edge servers. For example, the client may contract to be allocated 10 GB of storage at the edge servers. As clients request more and more content from the content provider's website, the cache memory allocated to the content provider will fill. As the cache memory fills, the edge server needs to invoke a replacement process that implements the replacement policy to determine what content from the cache memory is to be removed to make room for newly requested content.

Figure 3:
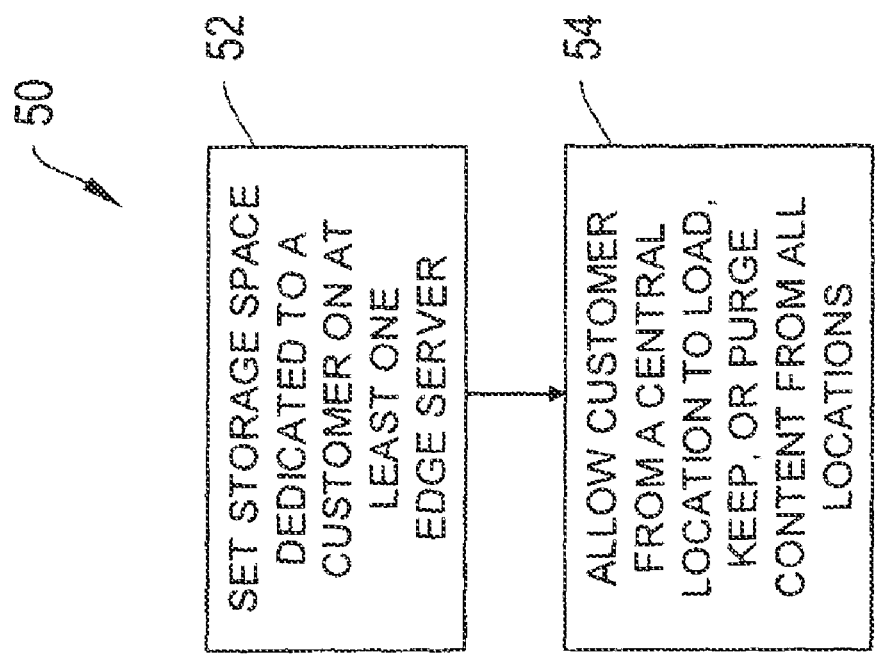
FIG. 3 depicts a flow chart showing a process for initializing the content stored at an edge server.

FIG. 3 depicts a flow chart diagram of one process for allowing a content provider to initialize the storage space set up on the edge servers of a content delivery network. In particular, FIG. 3 depicts a process 50 that starts at a step 52 wherein the content provider contracts with the content delivery network and the content delivery network sets the storage space dedicated to the content provider on at least one of the edge servers. In one example, the content delivery network may set up a storage space of about 15 GB for the customer and provide the storage on each of the edge servers located on the content delivery network. After setting up the storage space, the process 50 proceeds to step 54 wherein the customer is allowed to access a central location to load, keep, or purge content from all locations on the content delivery network. In this way, the process 50 allows the content provider to initialize the cache memory allocated to that content provider and to begin establishing the replacement policy for the stored content. For example, at step 54 the content provider can access a central location to identify the content that is currently in the cache memories in the different edge servers. At the content provider's discretion, the allocated storage may be purged so that all content stored in the memory allocated to that content provider is deleted. The content provider can then use the central location to load or upload to the edge server cache memories content that they want to have available when a user or client, such as client 28 of FIG. 1, starts requesting data. Typically, the client would request data as described in FIG. 2 by requesting a base HTML page from a website associated with the content provider. The base web page has modified URLs that direct the client to access content from the content delivery network. The content delivery network can receive requests for content from the client and can identify which edge server located on the content delivery network is best suited for delivering the content to the requesting client. The client can then receive a modified URL that directs the client to request the content from the identified edge server. In the process 50, the content provider can load into the cache memories of one or more of the edge servers content to which the base HTML page points, so that the client requesting the base HTML page will be redirected to the content delivery network and in turn to specific edge servers in that content delivery network to collect the content loaded by the content provider.

As further depicted at step 54, the customer can designate content loaded into the edge server to be kept in the cache memory. The designation keep can identify certain content as being fixed within the cache memory and the replacement policy instituted at the edge server will not remove such content from the cache memory. In the embodiments depicted in FIGS. 1 and 2, only one edge server is shown attached to the network. However, it will be apparent to those of skill in the art that a typical content delivery network has a plurality of edge servers. Thus, the process 50 depicted in FIG. 3 can be applied to one or more of the edge servers located on a content delivery network, thereby giving a content provider more flexible control over what data is stored in the cache memory of which edge server. Thus, the customer can choose to configure the initial content stored in a cache memory of one edge server differently than the content initially located in another cache server. Similarly, the customer can designate different content to be kept in different edge servers. In this way, the content provider can try different configurations to identify the configuration that is most desirable whether it is most cost effective, most efficient or meets some other criteria established by the content provider.

Figure 4:
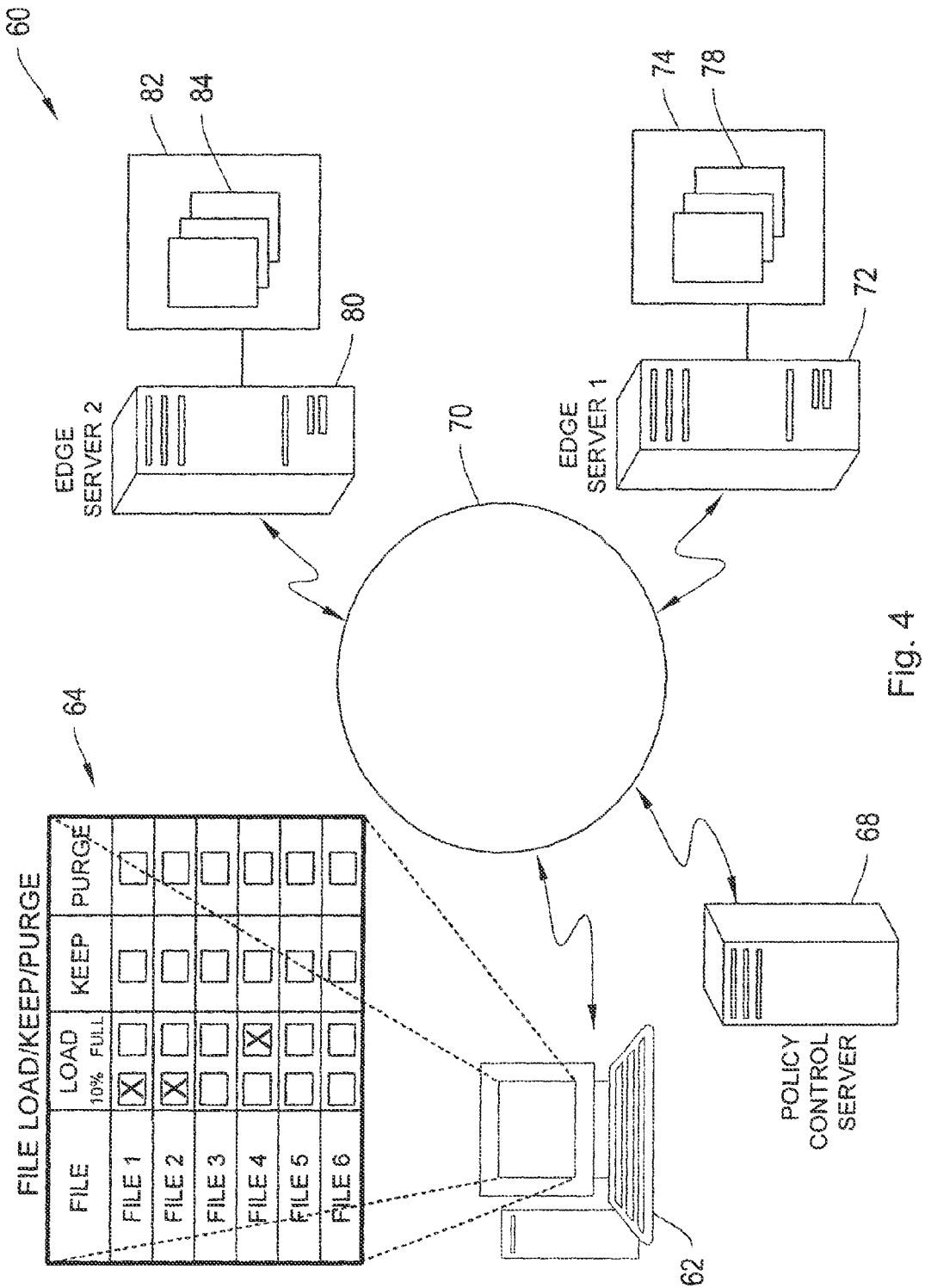
FIG. 4 depicts a content provider initializing the content stored at an edge server.

Turning to FIG. 4, one embodiment of a system that allows a customer to go to a central location to load, keep, or purge content from the edge servers on the network is depicted. In particular, FIG. 4 depicts a content delivery network 60 that allows a content provider at station 62 to log into a policy control server 68. As shown in FIG. 4, the policy control server 68 couples to the network 70 on which are edge servers 72 and 80 each having separate cache memories 74 and 82, respectively, with cache content 78 and 84, respectively. As further shown by FIG. 4, the content provider at the work station 62 can log into a central site where a user interface 64 can be accessed. The user interface 64 presents to the content provider the files that are locally stored on one or more of the edge servers 72 and 80. As further shown, each file is associated with a set of parameters that can be manipulated as options by the content provider through the user interface. In particular, the user interface 64 depicted in FIG. 4 shows that the amount of each file to be maintained in the cache memory can be set to either a portion, such as the depicted 10 percent, or the full amount. Additionally, each file can be designated as a keep file or may be purged from the cache memory. Thus, the user interface 64 allows the content provider to implement the process 50 depicted in FIG. 3. To this end, the policy control server 68 can include an application program that generates the user interface 64 and delivers the user interface to the work station 62. Typically, the user interface is an HTML page that has a series of check boxes that can be manipulated by the content provider to set the controls and parameters for the different files to be stored in the cache memory. Not shown in FIG. 4 is an upload feature that the content provider can use for uploading files such as the depicted FILE 1 to the cache memory of a respective edge server. The policy control server 68 can push the uploaded files down to the appropriate edge servers 72 and 80 and provide the parameters associated with these files to the replacement policy program running on the respective edge servers 72 and 80.

Moreover, it will be apparent to those skilled in the art that the depicted replacement policy server may be realized as a software component operating on a conventional data processing system such as a Unix workstation. In that embodiment, the replacement policy server can be implemented as a C language computer program, or a computer program written in any high level language including C++, Fortran, Java or BASIC. Additionally, in an embodiment where microcontrollers or DSPs are employed, the replacement policy server may be realized as a computer program written in microcode or written in a high level language and compiled down to microcode that can be executed on the platform employed. The development of such replacement policy server processes and programs is known to those of skill in the art, and such techniques are set forth in, for example, Stephen G. Kochan, Programming in C, Hayden Publishing (1983).

The edge servers can load content into cache memories based on user requests, or the content provider can use the interface 64 to upload content to the edge server cache memories. Once memory space of at least one edge server has been allocated to the content provider, the content delivery network can operate as presented in FIG. 5 which depicts a process 90. Process 90 begins at step 92 wherein customers are allowed to set up a custom defined replacement policy for the space the customer has on the different edge servers. Once that policy is set up the process 90 at step 94 will populate the respective edge servers based on client requests until the cache memory of the respective edge servers were full. Thus, as discussed with reference to FIG. 2, as a client requests HTML pages from the customer's website, content is delivered to the client including content delivered from the cache memory of the edge server. As more and more content is requested from the client's server, more and more content gets stored on the cache memory of the edge server. Typically, repeated requests for the same content will be served from the memory of the cache server. The cache server will retrieve requests for new files from an origin, serve them to the client, and store a local copy. As the cache memory fills, the process 90 proceeds from step 94 to 98. At step 98, the edge server replacement policy is activated to replace content on the edge server. The content and the edge server is replaced per the customer's specific replacement policy. In one practice, the replacement policy can implement an LRU replacement policy that is subject to the restrictions, such as keeping certain content in memory, which were set up by the content provider through the user interface 64 depicted in FIG. 4. In this way, the content provider has control over what content is removed from the edge server.

Figures 5, 6:
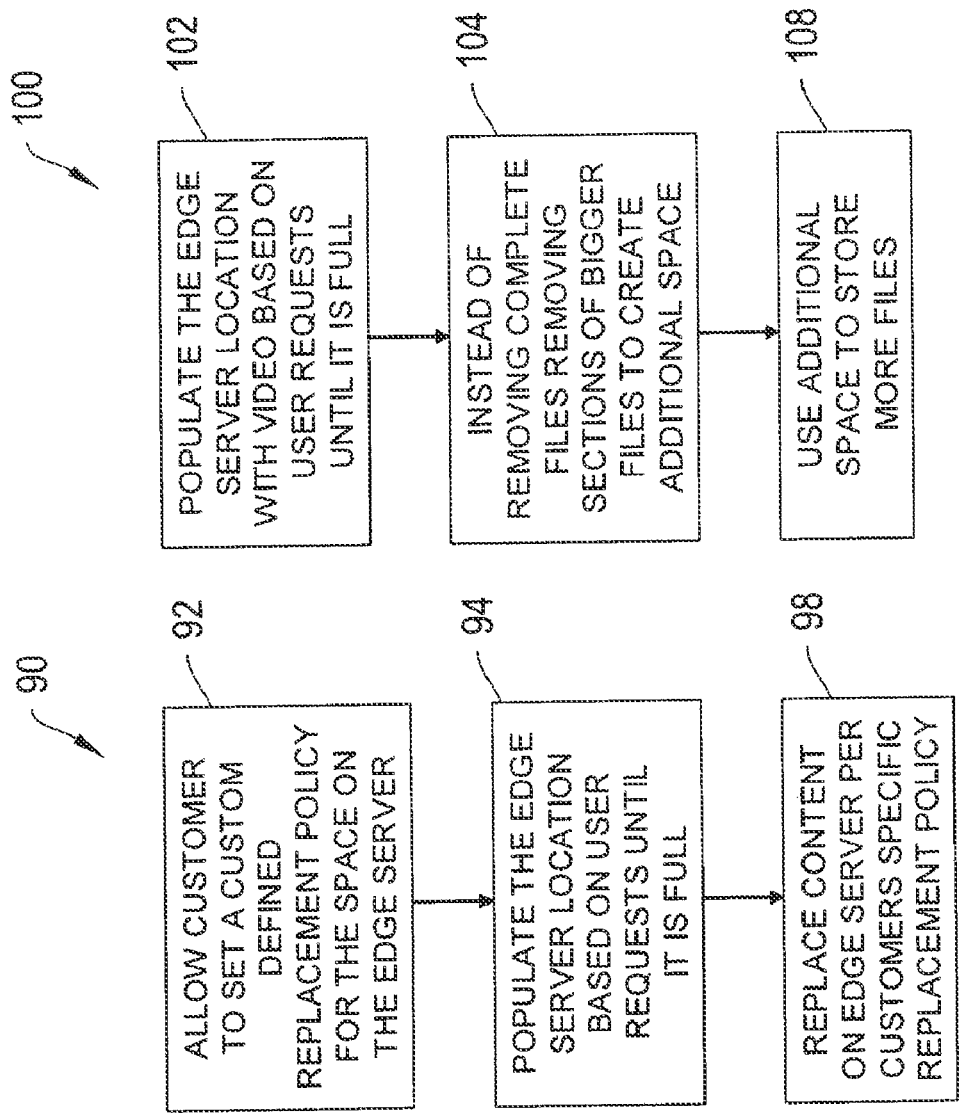
FIG. 5 depicts a flow chart of one process for allowing a content provider to establish a replacement policy.
FIG. 6 depicts a flow chart process for the operation of a content delivery network of the type described herein.

Turning to FIG. 6, a further process is depicted that can be implemented on the system depicted in FIG. 1. In particular, FIG. 6 depicts a process 100 that includes a step 102 wherein the edge server is populated with video based on client requests until the cache memory allocated to the content provider is full. Once full, the process proceeds to step 104 wherein the replacement policy will remove portions of the video files leaving a portion behind to be served from the cache memory. In this way, instead of removing complete files such as large video files, only sections of the bigger files are removed, thereby creating sufficient space for storing other content at the cache memory. However, the portion that gets left behind, typically the first 10 percent or some other initial portion of a video content, can be served directly from the cache memory. This allows the client 28 to experience a timely delivery of video content to begin playing on their system. As the video is played for the client 28, the edge server can request the other portion of the video that has been removed from the cache memory from the content provider site, mirror site, a local or remote storage device, a peer to peer network, or other device in communication with the network. The portion of the content stored in the cache memory is understood to be sufficiently large to allow the edge server sufficient time to pull the rest of the content from the content provider's site, or from elsewhere on the network, without interfering with the quality of experience the client is getting while viewing the video. After step 104, the process can proceed to step 108 wherein the additional space provided by removing sections of the larger video files is made available to store more files.

Those skilled in the art will know or be able to ascertain using no more than routine experimentation, many equivalents to the embodiments and practices described herein. For example, instead of or in addition to storing content at edge servers, a portion of a file, or other content, may be stored on a client device, portable device, home entertainment system, or other device located more locally to the end user. The file or content may be retrieved locally initially and then the rest of the file or content may be retrieved from elsewhere in the network, such as from a server in a CDN.

Accordingly, it will be understood that the invention is not to be limited to the embodiments disclosed herein, but is to be understood from the following claims, which are to be interpreted as broadly as allowed under the law.

The invention claimed is:

1. A method for controlling content replacement within a content delivery system, the method comprising:

setting a content provider specified replacement policy for an edge server of the content delivery system, wherein the replacement policy specifies at least an initial portion of content from the content provider to preload, wherein according to the replacement policy, the edge server preloads only the initial portion of the content to said edge server prior to said content being requested, the initial portion of the content being less than an entirety of the content; and caching content of the content provider at the edge server according to the replacement policy.

2. The method of claim 1, further comprising providing a user interface configured for accepting from said content provider parameters of the replacement policy.

3. The method of claim 2, wherein the replacement policy is a first replacement policy that applies to a first set of content of the content provider and wherein the user interface is configured for accepting from said content provider parameters of a second replacement policy for the edge server to apply to a second set of content of the content provider.

4. The method of claim 1, wherein the replacement policy further specifies the initial portion of the content as a percentage of the content to preload at said edge server, and wherein caching content according to the replacement policy comprises preloading only the percentage of the content at the edge server prior to the content being requested.

5. The method of claim 4, wherein the content is a particular piece of media content comprising a set of media files and wherein caching content of the content provider comprises preloading at least a first media file of the set of media files at the edge server prior to the particular piece of media content being requested and retrieving at least a second media file of the set of media files from the content provider when the particular piece of media content is requested.

6. The method of claim 5, wherein the particular piece of media content is a video.

7. The method of claim 1, wherein the content is a particular piece of media content comprising a set of media files and wherein caching content of the content provider comprises caching a subset of the set of media files corresponding to the particular piece of media content at the edge server prior to the particular piece of media content being requested.

8. The method of claim 1, wherein the content comprises a particular web page, and the initial portion of the content comprises a set of embedded objects for the particular web page.

9. The method of claim 1, wherein the replacement policy further specifies particular content of the content provider to remove from said edge server, the particular content to remove comprising a set of media files that is associated with a particular piece of media content, wherein the replacement policy further specifies a percentage to remove from the end of the particular content, and wherein caching content according to the replacement policy further comprises removing the percentage from the end of the particular piece of media content by removing at least one media file of the set of media files.

10. The method of claim 1, wherein the replacement policy further specifies a memory allocation quota that is associated with the content provider, and wherein caching content according to the replacement policy further comprises initiating removal from the edge server of a portion of a particular piece of media content other than the initial portion of the content in response to the memory allocation quota being exceeded.

11. The method of claim 1, wherein the replacement policy further specifies (i) a percentage of the content and (ii) a memory allocation quota that is associated with the content provider.

12. The method of claim 11, wherein caching content according to the replacement policy further comprises removing said percentage of the content from the edge server in response to the memory allocation quota associated with the content provider being exceeded.

13. The method of claim 1, wherein the replacement policy further specifies a portion of the content to remove from the edge server, and wherein caching content according to the replacement policy comprises removing the portion of the content from the edge server.

14. The method of claim 1, wherein the initial content from the content provider is specified in a base HTML page, wherein the base HTML page redirects to the content delivery system a request for content to which the base HTML page points.

15. The method of claim 2, wherein the user interface is further configured to allow the content provider to view content currently cached at the edge server.

16. The method of claim 2, wherein the user interface is further configured to allow the content provider to lock content in the edge server for preventing the content from being removed.

17. A content delivery system comprising:
a first edge server having memory and configured for caching content of a particular content provider in the memory according to a first replacement policy;
a second edge server having memory and configured for caching content of the particular content provider in the memory according to a second replacement policy; and
a user interface configured for accepting from the particular content provider parameters of the first replacement policy for the first edge server and parameters of the second replacement policy for the second edge server, wherein the first replacement policy is different than the second replacement policy.

18. The content delivery system of claim 17, wherein the first replacement policy specifies content to preload to the memory of the first edge server.

19. The content delivery system of claim 17, wherein the first replacement policy specifies content to remove from the memory of the first edge server.

20. The content delivery system of claim 19, wherein the first replacement policy further specifies content to remove from the memory of the first edge server when usage at the first edge server exceeds an amount of memory that is allocated for use by the particular content provider.

21. The content delivery system of claim 17, wherein the user interface is further configured for accepting from the particular content provider parameters of a third replacement policy for the first edge server, wherein the first replacement policy applies to a first set of content of the particular content provider and the third replacement policy applies to a second set of content of the particular content provider.

22. The content delivery system of claim 17,
wherein the first replacement policy further specifies a first set of content to preload to the memory of the first edge server, and the second replacement policy further specifies a second set of content to remove from the memory of the second edge server, and
wherein caching content according to the first replacement policy further comprises preloading the first set of content to the memory of the first edge server, and caching content according to the second replacement policy further comprises removing the second set of content from the memory of the second edge server.

23. The content delivery system of claim 17,
wherein the first replacement policy further specifies a first percentage of the first set of content to preload to the memory of the first edge server, and the second replacement policy further specifies a second percentage of the second set of content to remove from the memory of the second edge server, wherein the first percentage is different than the second percentage, and wherein caching content according to the first replacement policy further comprises preloading the first percentage of the first set of content to the memory of the first edge server, and caching content according to the second replacement policy further comprises removing the second percentage of the second set of content from the memory of the second edge server.

24. The content delivery system of claim 17, wherein the user interface is further configured to allow the content provider to view content currently cached at the edge server.

25. The content delivery system of claim 17, wherein the user interface is further configured to allow the content provider to lock content in the edge server for preventing the content from being removed.

26. The content delivery system of claim 18, wherein the first replacement policy specifies an initial portion of the content to preload, wherein the initial portion of the content is less than the entirety of the content, and caching content according to the first replacement policy comprises caching only the initial portion of the content to the memory of the first edge server prior to the content being requested.

27. A computer readable storage medium storing a computer program for controlling content replacement within a content delivery system, the computer program for execution by at least one processor, the computer program comprising:
   a set of instructions for setting a content provider specified replacement policy for an edge server of the content delivery system, wherein the replacement policy specifies at least an initial portion of content from the content provider to preload, wherein according to the replacement policy, the edge server preloads only the initial portion of the content to said edge server prior to said content being requested, the initial portion of the content being less than an entirety of the content; and
   a set of instructions for caching content of the content provider at the edge server according to the replacement policy.

* * * * *